Jan. 2, 1923.
C. H. GILL.
TRANSMISSION MECHANISM.
FILED DEC. 29, 1920.
1,440,536.
2 SHEETS—SHEET 1.
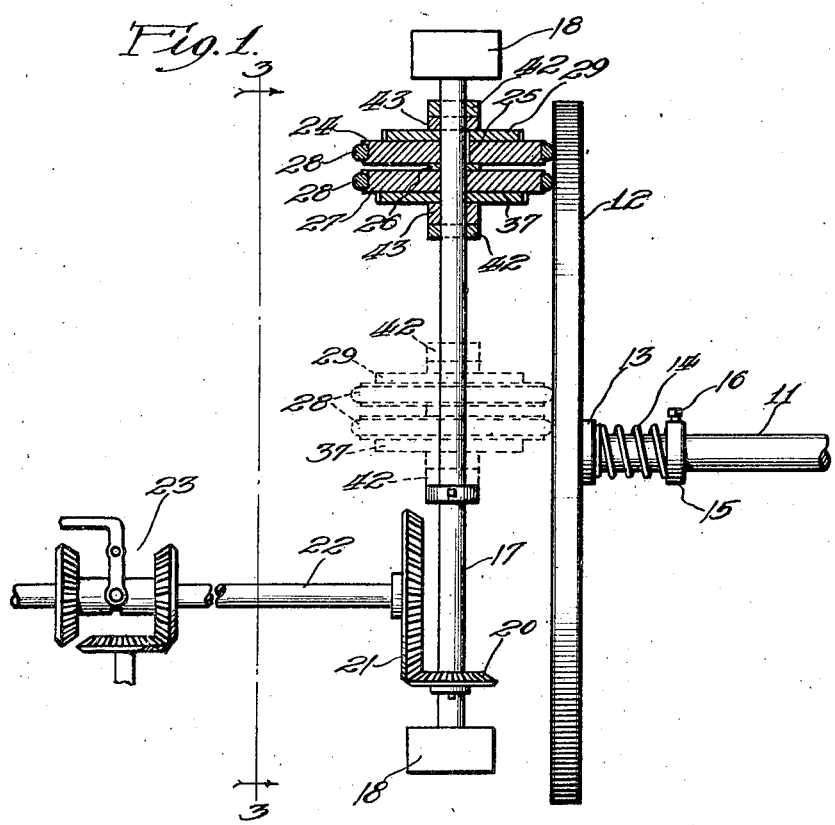
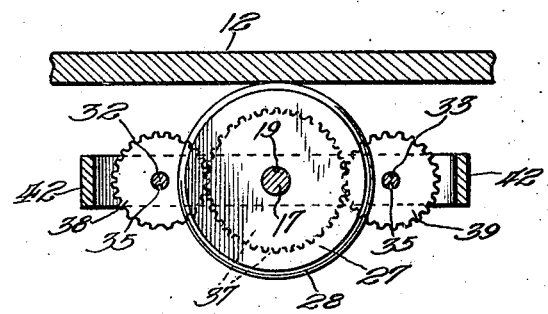
Witness:
Stephen T. Kelner
Inventor
Charles H Gill Jan. 2, 1923.
C. H. GILL.
TRANSMISSION MECHANISM.
FILED DEC. 29, 1920.
1,440,536.
2 SHEETS—SHEET 2.
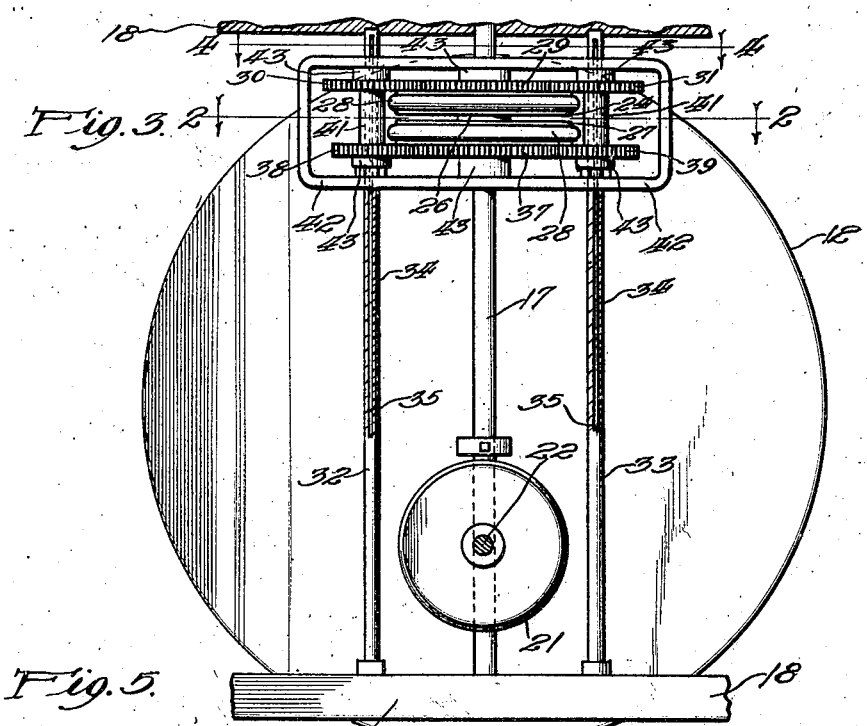
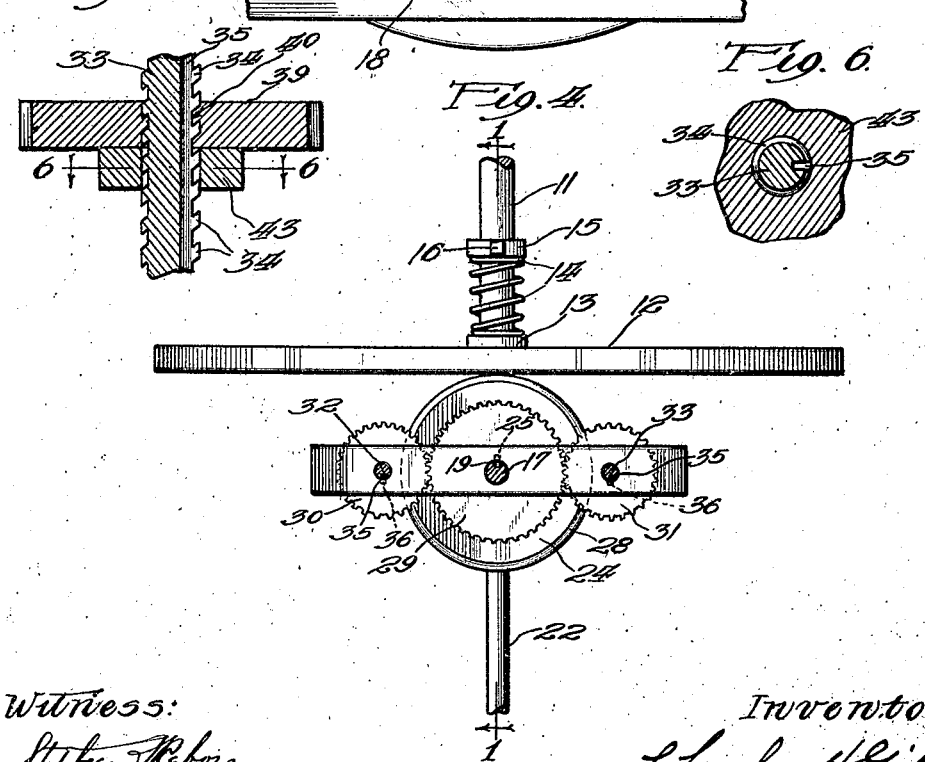
Witness:
Stephen Rebora
Inventor:
Charles H Gill Patented Jan. 2, 1923.

1,440,536

UNITED STATES PATENT OFFICE.

CHARLES H. GILL, OF CHICAGO, ILLINOIS.

TRANSMISSION MECHANISM.

Application filed December 29, 1920. Serial No. 433,930.

*To all whom it may concern:*

Be it known that I, CHARLES H. GILL, a citizen of the United States, residing at Chicago, in the county of Cook and State of Illinois, have invented a new and useful Transmission Mechanism, of which the following is a specification.

My invention relates to speed changing means for controlling the speed of rotation of a driven shaft relative to the speed of rotation of a driving shaft and for automatically changing the relative speed of said driven shaft to meet differing power requirements due to changes in the resistance offered to the rotation of the said driven shaft. While my invention is primarily intended to replace the usual speed changing gears of automobiles, it is by no means limited to such application, being advantageous in every situation wherein speed changing mechanism of other types is advantageous.

My present application is for the purpose of setting forth and claiming certain improvements in construction over that disclosed in my previous application for Letters Patent on friction transmission mechanism, filed April 17th, 1920, Serial Number 374,683.

The objects of my present invention are substantially the same as those stated in the previous application above referred to, with some additions. My objects are, first, to provide a frictional speed changing mechanism; second, to provide automatic means adapted to change the degree of leverage exerted by the driving shaft upon the driven shaft to meet changing power requirements of the driven shaft; third, to provide means for adjusting the said mechanism to conform to varying degrees of power of the driving shaft; and, fourth, to provide means for adjusting the said mechanism to conform to varying power requirements of the driven shaft.

I attain these objects by the mechanism illustrated in the accompanying drawings, in which—

Figure 1 is a side elevation of my complete invention in one of its forms, with a portion in section taken on the line 1—1 of Figure 4; Figure 2 is a detail plan section taken on the line 2—2 of Figure 3; Figure 3 is a front elevation and part section taken on the line 3—3 of Figure 1; Figure 4 is a plan view taken on the line 4—4 of Figure 3; Figure 5 is an enlarged detail section of the threaded portion of one of the shift operating shafts and of the internally threaded member engaging therewith; and Figure 6 is a section taken on the line 6—6 of Figure 5.

Similar numerals designate similar parts throughout the several views.

11 designates a shaft adapted to be driven by a motor and a friction disk 12 is slidably feathered upon the shaft 11 near its end in such manner that the friction disk 12 must rotate with the shaft 11 but is longitudinally slidable thereon. A washer 13 surrounds the shaft 11 and abuts against the friction disk 12. A spiral spring 14 also surrounds the shaft 11 and presses one of its ends against the washer 13 and the other end against a collar 15 which is adjustably fixed to the shaft 11 by means of the set screw 16. Thus, the disk 12 is constantly urged along the shaft 11 in a direction away from the collar 15 and with force depending upon the position of the collar 15.

A shaft 17 is journaled in a frame 18 for free rotation. The shaft 17 is provided with a longitudinally running keyway 19 for a portion of its length and with a bevel gear wheel 20 fixed to rotate with it. The bevel gear wheel 20 meshes with another bevel gear wheel 21 fixed upon a shaft 22 which may lead directly to the mechanism to be driven or may have a reversing device 23 interposed. Since the reversing device forms no part of my invention and may be of any of numerous well known constructions, I will not describe it.

A friction wheel 24 is mounted upon the shaft 17 and provided with an internally extending feather 25 which slides in the keyway 19 in the shaft 17, permitting free longitudinal movement of the friction wheel 24 upon the shaft 17 but locking the wheel and shaft together for rotation. A washer 26 surrounds the shaft 17 and separates the friction wheel 24 from another friction wheel 27 which is mounted upon the shaft 17 as an idler and is freely rotatable upon or slidable longitudinally upon the shaft 17. Both the friction wheels 24 and 27 are of like diameter and both are pressed against at their peripheries by the friction disk 12 and rotated by the rotation of the friction disk 12, the friction wheel 27 turning upon the shaft 17 as an idler and the friction wheel 24 rotating the shaft 17 with it.

Because of the fact that the friction wheel 24 engages the disk 12 at a point somewhat further from the center of the disk 12 than the point at which the friction wheel 27 engages that disk, the friction wheel 24 will be rotated somewhat faster than the friction wheel 27. Both of the friction wheels 24 and 27 are grooved at their peripheries and carry therein bands of frictional material 28.

A gear wheel 29 is secured to the friction wheel 24 to rotate with it and this gear wheel 29 meshes with pinions 30 and 31 mounted upon shafts 32 and 33, which shafts are parallel with and at opposite sides of the shaft 17 and are rotatably journaled in the frame 18. Both the shafts 32 and 33 are threaded throughout a part of their lengths with threads 34 which are preferably of a steep spiral cut to give maximum longitudinal movement to an engaging internally threaded member with minimum rotation of the shafts 32 and 33. Both of the shafts 32 and 33 are also provided with keyways 35 deeply cut therein so as to extend further toward the centers of said shafts than do the grooves between the spiral threads 34. For a portion of their length, these keyways 35 extend through the threads 34, the latter being cut away in forming the keyways.

The pinions 30 and 31 are each provided with internally extending feathers 36 that engage and slide in the keyways 35 in the shafts 32 and 33 respectively, permitting the pinions 30 and 31 to slide longitudinally of their respective shafts freely but locking them for rotation with their shafts.

A gear wheel 37 is secured to the friction wheel 27 to rotate with that friction wheel and this gear wheel 37 meshes with pinions 38 and 39 mounted upon the shafts 32 and 33 respectively. The pinions 38 and 39 are provided with internal threads 40 which engage with the external threads 34 upon the shafts 32 and 33 respectively and these pinions 38 and 39 are, therefore, adapted to screw upward or downward upon the shafts 32 and 33 respectively when either those pinions or those shafts are rotated. Since the pinions 38 and 39 must rotate in unison with each other, because of their common engagement with the gear wheel 37, the pinions 38 and 39 will screw upward in unison or downward in unison, as the case may be. The pinions 30 and 38 and the pinions 31 and 39 are respectively separated and maintained in spaced position to each other by means of sleeves 41 between them.

A movable frame 42 encloses the friction wheels 24 and 27 and their attached gear wheels 29 and 37 and all of the pinions upon the shafts 32 and 33, being provided with circular openings permitting the passage through said frame 42 of the shafts 17, 32 and 33. Washers 43 surround the various shafts within the frame 42 and maintain the members therein in fixed relationship to each other longitudinally of their shafts.

In this mechanism it is essential that the shafts 32 and 33 shall be normally rotated a little faster than the internally threaded pinions 38 and 39 are, so that there will normally be a steady travel of the frame 42 and its contents toward the circumference of the friction disk 12. However, the difference in the distance of the friction wheels 24 and 27 respectively from the center of the disk 12 is, as shown herein, enough to cause the speed of the shafts 32 and 33 to be more in excess of the speed of the internally threaded pinions 38 and 39 than is desirable. This excess of speed of the shafts 32 and 33 is, therefore, reduced to the desired difference by making the gear wheel 29 with a few less teeth in it than the gear wheel 37 has and by making the pinions 30 and 31 with a few more teeth in them than the pinions 38 and 39 have.

In the operation of this mechanism the power of the motor is transmitted through the shaft 11 as rotary motion and this, in turn, rotates the friction disk 12 which, being pressed against the friction wheels 24 and 27 rotates them at increased speed. As the friction wheel 24 is feathered to the shaft 17, this shaft is rotated with that wheel and reduced rotary motion is thence transmitted to the driven shaft 22 through the engagement of the bevel gear wheels 20 and 21.

At the same time, through the engagement of gear wheel 29 with pinions 30 and 31, the shafts 32 and 33 are caused to rotate at greater speed than the shaft 17. Through the engagement of gear wheel 37 with pinions 38 and 39, these internally threaded pinions are also caused to rotate in the same directions as their respective shafts 32 and 33, but at somewhat less speed. The effect of these internally threaded pinions rotating at less speed than their threaded shafts is precisely the same as if the pinions were stationary and the threaded shafts were rotating in an unscrewing direction at a speed equal to the difference in speed of the pinions and the shafts. Consequently, the pinions 38 and 39 will move upwardly upon their shafts and will carry with them the frame 42 and all of its contents. Hence, the driving friction wheel 24 will be progressively advanced toward the circumference of the friction disk 12 and will be progressively driven faster until that friction wheel 24 reaches a point toward the circumference of the friction disk 12 where the load it is driving becomes too great for it to drive at the speed attained, when the friction wheel 24 will begin to slip slightly. As the friction wheel 27 will not have the same cause for slipping, carrying little or no load, it will continue at the full speed it is driven by the disk 12. When the amount of slippage of the friction wheel 24 in each rotation becomes sufficient to bring the speeds of the shafts 32 and 33 and of the internally threaded pinions 38 and 39 to equality, there will be no further upward and no downward movement of the frame 42, but a condition of driving balance will occur and the mechanism driven by the shaft 22 will be driven steadily at a speed proportional to the position of the friction wheel 24 with respect to the friction disk 12.

Now, should the load being driven be increased, or should the resistance offered to the rotation of the shaft 22 be added to in any way, there will be further slippage of the friction wheel 24, causing the shafts 32 and 33 to rotate less rapidly than the pinions 38 and 39 and, consequently, causing a downward movement of the frame 42, which will continue until the friction wheel 24 reaches a point upon the disk 12 where its slippage will be reduced to a degree to restore balance. Thus, when extra power is required, my mechanism immediately adjusts itself to deliver greater power and lesser speed; when less power is needed it adjusts itself to deliver less power and more speed, making adjustment of the speed changing means a perfectly automatic function of the device itself and requiring no attention of a driver.

Not only does this invention permit the driver of an automobile or other machine to have his mind free of concern regarding the speed gearing of the machine but it enables him to drive his machine at the most economical rate by keeping his engine or motor running at no greater speed than is required to deliver the required speed to the driven mechanism at any time. When used in an automobile, for instance, the driver need not ever concern himself with anything except the speed of the engine or motor in attaining whatever rate of travel speed he desires.

By means of the collar 15 and set screw 16, the pressure of the disk 12 against the friction disks or wheels 24 and 27 can be regulated according to the power of the engine or motor. If set so as to have too much pressure, this will cause the engine or motor to stop under an increased load, instead of allowing the friction wheel 24 to slip. If set so that there is insufficient pressure for the power of the engine or motor, the friction wheel 24 will slip at points too near the center of the disk 12 to permit of attaining all of the speed with the load that the engine or motor is capable of giving. The correct pressure is readily determinable.

It will be evident that numerous departures from the construction specifically described herein might be made without departing from the spirit of my invention. Hence, I do not wish to be understood as limiting the scope of my invention to the specific construction described or as acquiescing in any limitations of the same except such as may be imposed by the prior state of the art or included in the claims forming a part of this specification.

I claim:

1. In transmission mechanism, the combination of a driving member, a driven shaft, two elements rotatable by said driving member and movable radially of said driving member while maintaining fixed spaced relationship to each other, and means controlled by the degree of yield of one of said elements in its engagement with the said driving member for automatically varying the ratio of the speed of the said driven shaft to the speed of the said driving member inversely to variations in the degree of resistance offered to the rotation of the said driven shaft.

2. In transmission mechanism, the combination of a driving member, a driven shaft, two elements rotatable by said driving member and movable radially of said driving member while maintaining fixed spaced relationship with each other, and means controlled by the degree of yield of one of said elements in its engagement with the said driving member relative to the degree of yield of the other of said elements in its engagement with the said driving member for automatically varying the ratio of the rotary speed of the said driven shaft to the speed of the said driving member inversely to variations in the degree of resistance offered to the rotation of the said driven shaft.

3. In transmission mechanism, the combination of a driving friction member, a driven shaft, two friction wheels frictionally engaging the said driving friction member and movable radially thereof while maintaining fixed spaced relationship to each other, and means controlled by variations in the degrees of slippage of the said friction wheels relative to each other in their frictional engagements with the said driving friction member for automatically varying the ratio of the rotary speed of the said driven shaft to the rotary speed of the said driving friction member inversely to variations in the degree of resistance offered to the rotation of the said driven shaft.

4. In transmission mechanism, the combination of a driving friction member, a driven shaft, two friction wheels frictionally engaging the said driving friction member and movable radially thereof while maintaining fixed spaced relationship to each other, and means controlled by variations in the ratio of slippage of one of said friction wheels in its engagement with the said driving friction member to the slippage of the other of said friction wheels in its engagement with the said driving friction member for automatically varying the ratio of the rotary speed of the said driven shaft to the rotary speed of the said driving friction member inversely to variations in the degree of resistance offered to the rotation of the said driven shaft.

5. In transmission mechanism, the combination of a driving friction member, a driven shaft, two friction wheels frictionally engaging the said driving friction member and rotatable thereby in like directions to each other, and automatic means controlled by variations in the speeds of the said friction wheels relative to each other for varying the ratio of the rotary speed of the said driven shaft to the rotary speed of the said driving friction member inversely to variations in the degree of resistance offered to the rotation of the said driven shaft.

6. In transmission mechanism, the combination of a rotatable friction driving member, the driven friction members engaging said friction driving member frictionally and rotatable thereby, means for holding the two said friction driven members in spaced relationship to each other, and automatic means controlled by the varying degrees of resistance that may be offered to the rotation of one of the said driven friction members for varying the distance from the axis of rotation of the said friction driving member of the point of engagement between the said friction members in such manner that the said driven friction members will approach the axis of rotation of the said friction driving member proportionately to any increase in the resistance offered to the rotation of one of the said driven friction members and will recede from said axis of rotation of said friction driving member proportionately to any decrease in the resistance offered to the rotation of the said driven friction member.

7. In transmission mechanism, the combination of a friction driving wheel, a friction driven wheel rotatable through frictional engagement with said friction driving wheel, a rotatable shaft provided with a keyway longitudinally thereof and having the said friction driven wheel feathered slidably thereon, a rotatable threaded shaft provided with a keyway longitudinally thereof, a member feathered slidably upon said threaded shaft and rotatable by said friction driven wheel through suitable gearing, an internally threaded member mounted upon said threaded shaft and engaging with the threads thereof and rotatable through the said friction driving wheel through suitable gearing, and means for securing the said friction driven wheel and the two said members together for concerted longitudinal movement upon their respective shafts in the same direction.

8. In transmission mechanism, the combination of a rotatable friction driving member, a friction driven wheel engaging with and rotatable by said friction driving member, resilient means for maintaining pressure of the said friction driving member and the said friction driven wheel against each other, means for adjusting the said resilient means to control the degree of pressure exerted against each other by the said friction driving member and the said friction driven wheel, a shaft rotatable by the said friction driven wheel and mounting the said friction driven wheel slidably thereon, two rotatable threaded shafts disposed at opposite sides of and parallel with the said first named shaft with the threads of each of said threaded shafts oppositely disposed with respect to the threads of the other of said threaded shafts and each of said threaded shafts rotatable by the said friction driven wheel in opposite rotary directions to each other, threaded members rotatably mounted one upon each of said threaded shafts and engaging the threads of said threaded shafts in such manner as to be spirally movable in similar directions longitudinally of and upon their respective shafts when rotating at speeds differing from the rotary speed of the said threaded shafts but each in the same rotary direction as its respective threaded shaft, means for transmitting rotary motion from the said friction driving member to the said threaded members so that each of said threaded members will be rotated at like speed but in opposite directions and at rotary speeds normally somewhat less than the rotary speeds of their respective threaded shafts, and means adapted to communicate the movements of the said threaded members in like directions longitudinally of and upon their respective shafts to the said friction driven wheel to cause similar longitudinal movement of the said friction driven wheel upon its shaft and to thus change the point of frictional engagement of the said friction driven wheel with the said friction driving member with respect to the axis of rotation of the said friction driving member.

9. In transmission mechanism, the combination of a rotatable friction driving member, a friction driven wheel engaging with and rotatable by said friction driving member, resilient means for maintaining pressure of the said friction driving member and the said friction driven wheel against each other, means for adjusting the said resilient means to control the degree of pressure exerted against each other by the said friction driving member and the said friction driven wheel, a shaft rotatable by the said friction driven wheel and mounting the said friction driven wheel slidably thereon, a threaded shaft rotatable by the said friction driven wheel, a second friction driven wheel mounted upon the said first named shaft to rotate freely thereon and rotatable by the said friction driving member, a threaded member rotatably mounted upon the said threaded shaft to engage the threads of the said threaded shaft and spirally movable longitudinally of and upon the said threaded shaft, means for transmitting rotary motion from the said second friction driven wheel to the said threaded member in the same direction of rotation as the said threaded shaft but at normally slightly lesser rotary speed than the rotary speed of the said threaded shaft, and means adapted to communicate the movements of the said threaded member longitudinally of and upon its shaft to the said friction driven wheels to cause similar longitudinal movement of the said friction driven wheels upon their shaft and to thus change the points of frictional engagement of the said friction driven wheels with the said friction driving member with respect to the axis of rotation of the said friction driving member.

10. In transmission mechanism, the combination of a rotatable friction driving member, a friction driven wheel engaging with and rotatable by the said friction driving member, resilient means for maintaining pressure of the said friction driving member and the said friction driven wheel against each other, means for adjusting the said resilient means to control the degree of pressure exerted against each other by the said friction driving member and the said friction driven wheel, a shaft rotatable by the said friction driven wheel and mounting the said friction driven wheel slidably thereon, two rotatable threaded shafts disposed at opposite sides of and parallel with the said first named shaft with the threads of each of said threaded shafts oppositely disposed with respect to the threads of the other of said threaded shafts and each of said threaded shafts rotatable by the said friction driven wheel in opposite rotary directions to each other, a second friction driven wheel mounted upon the said first named shaft to rotate freely thereon and rotatable by the said friction driving member, two threaded members rotatably mounted one upon each of the said threaded shafts and engaging the threads of said threaded shafts in such manner as to be spirally movable in similar directions longitudinally of and upon their respective shafts when rotating at speeds differing from the rotary speed of the said threaded shafts but each in the same rotary direction as its respective threaded shaft, means for transmitting rotary motion from the said second friction driven wheel to the said threaded members so that each of the said threaded members will be rotated at like speed to the other but in opposite directions to each other and at rotary speeds normally somewhat less than the rotary speeds of their respective threaded shafts, and means adapted to communicate the movements of the said threaded members in like directions longitudinally of and upon their respective shafts to the said friction driven wheels to cause similar longitudinal movement of the said friction driven wheels upon their shaft and to thus change the points of frictional engagement of the said friction driven wheels with the said friction driving member with respect to the axis of rotation of the said friction driving member.

11. In transmission mechanism, the combination of a driving shaft, a friction disk carried by said driving shaft, a driven shaft, a friction wheel splined upon said shaft, a second friction wheel loosely driven shaft, a second friction wheel loosely mounted upon said driven shaft, both of said friction wheels being driven by said friction disk, means for maintaining the two said friction wheels in fixed spaced relationship to each other, and means controlled by differences in the rotary speeds of the said two friction wheels for causing their movment together longitudinally of and upon the said driven shaft and radially of the said friction disk and thus varying the ratio of the rotary speed of the said driven shaft to the rotary speed of the said driving shaft.

12. In transmission mechanism, the combination of a driving friction member, a driven shaft, a friction wheel splined upon said driven shaft and rotatable by said driving friction member, a threaded shaft rotatable by said driven shaft through gears, an internally threaded member mounted upon said threaded shaft in screw engagement therewith, a second friction wheel loosely mounted on said driven shaft and rotatable by said driving friction member and adapted to rotate the said internally threaded member in like direction to the rotation of the said threaded shaft, means for maintaining the said internally threaded member and the two said friction wheels in fixed spaced relationship to each other, and means controlled by variations in the relative speeds of rotation of the two said friction wheels for varying the ratio of the rotary speed of the said driven shaft to the rotary speed of the said driving friction member.

13. In transmission mechanism, the combination of a rotatable friction driving member, two friction wheels engaging the said rotatable friction driving member at differing distances from but upon the same side of the axis of the said rotatable friction driving member, and means controlled by the variations in the speeds of the two said friction wheels relative to each other for determining the distances from the said axis of the said rotatable friction driving member of the said two friction wheels in their engagements with the said rotatable friction driving member.

14. In transmission mechanism, the combination of a rotatable friction driving member, a driven shaft, two friction wheels upon said driven shaft and engaging the said rotatable friction driving member upon one side of the axis thereof, means for maintaining the said two friction wheels in fixed spaced relationship to each other, and means controlled by variations in the relative speeds of the said two friction wheels for varying the ratio of the rotary speed of the said driven shaft to the rotary speed of the said rotatable friction driving member inversely to variations in the degree of resistance offered to the rotation of the said driven shaft.

15. In transmission mechanism, the combination of two friction driven wheels held in fixed spaced relationship to each other, a driving shaft, a driven shaft, and automatic means controlled by variations in the relative rotary speeds of the said two friction wheels for varying the ratio of the rotary speed of the said driven shaft to the rotary speed of the said driving shaft inversely to variations in the degree of resistance offered to the rotation of the said driven shaft.

16. In transmission mechanism, the combination of a driving shaft, a friction member carried by said driving shaft, a driven shaft, a friction wheel splined upon the said driven shaft, a second friction wheel loosely mounted upon the said driven shaft, means for maintaining the two said friction wheels in fixed spaced relationship to each other, and means controlled by the relative variations in speed of the said friction wheels under varying degrees of resistance offered to the rotation of the said driven shaft for varying the ratio of the rotary speed of the said driven shaft to the rotary speed of the said driving shaft inversely to variations in the degree of resistance offered to the rotation of the said driven shaft.

17. In transmission mechanism, the combination of a driving shaft, a driven shaft, a friction disk rotatable by and with the said driving shaft, a friction wheel splined upon said driven shaft and slidable longitudinally thereon and radially of the said friction disk in continuous engagement with said friction disk, a second friction wheel mounted upon the said driven shaft for free rotation thereon and movable longitudinally thereof and thereon and radially of the said friction disk in continuous engagement with said friction disk, rotatable threaded shafts parallel with the said driven shaft and driven by said driven shaft through gearing, internally threaded members mounted upon the said threaded shafts in engagement with the threads thereof and driven by said second friction wheel in like directions to their respectively mounting threaded shafts, and means for maintaining the said friction wheels and said internally threaded members and said gearing in fixed spaced relationship to each other during their movements longitudinally of and upon the said driven shaft and the said threaded shafts.

18. In transmission mechanism, the combination of a driving shaft, a driven shaft, a friction wheel splined upon said driven shaft, a friction member carried by said driving shaft and driving said friction wheel, a second friction wheel driven by said friction member, means for maintaining the two said friction wheels in fixed spaced relationship to each other, a threaded shaft rotatable by said first named friction wheel, an internally threaded member mounted upon said threaded shaft in screw engagement therewith and rotatable by said second friction wheel, and means controlled by the degree of slippage of the said first named friction wheel in its engagement with the said friction member under varying degrees of resistance offered to the rotation of the said driven shaft for automatically varying the ratio of the rotary speed of the said driven shaft to the rotary speed of the said driving shaft inversely to variations in the degree of resistance offered to the rotation of the said driven shaft.

19. In transmission mechanism, the combination of a driving shaft, a driven shaft, a friction disk rotatable by and with the said driving shaft, a friction wheel splined upon said driven shaft and slidable longitudinally thereon and radially of the said friction disk in continuous engagement with said friction disk, a second friction wheel mounted upon the said driven shaft for free rotation thereon and movable longitudinally thereof and thereon and radially of the said friction disk in continuous engagement with said friction disk, two rotatable and oppositely threaded shafts set at opposite sides of the said driven shaft and parallel therewith and driven in opposite directions to each other by said driven shaft through gearing, internally threaded members mounted upon the said threaded shafts respectively in engagement with the threads thereof and driven by said second friction wheel in opposite directions to each other but in like directions to their respectively mounting threaded shafts, and means for maintaining the said friction wheels and said internally threaded members and said gearing in fixed spaced relationship to each other during their movements longitudinally of and upon the said driven shaft and the said threaded shafts.

20. In transmission mechanism, the combination of a driving shaft, a driven shaft, speed changing mechanism interposed between said shafts and adapted to transmit rotary motion from the said driving shaft to the said driven shaft, said speed changing mechanism comprising a friction disk carried by and rotatable with the said driving shaft and a friction wheel splined upon said driven shaft and movable upon said driven shaft radially of and in frictional engagement with the said friction disk, and automatic means including a second friction wheel loosely mounted upon said driven shaft and movable in like direction to and with said first named friction wheel radially of said friction disk and in engagement therewith for maintaining the ratio of the rotary speed of the said driven shaft to the rotary speed of the said driving shaft inversely proportional to the degree of resistance offered to the rotation of the said driven shaft.

CHARLES H. GILL.